United States Patent
Altamura

(10) Patent No.: US 10,578,206 B2
(45) Date of Patent: Mar. 3, 2020

(54) OIL TRANSFER ASSEMBLY, TO LET LUBRICATING OIL FLOW FROM A STATIONARY PART TO A ROTATING PART, IN PARTICULAR FOR AN EPICYCLIC TRANSMISSION

(71) Applicant: GE AVIO S.r.l., Rivalta di Torino (IT)

(72) Inventor: Paolo Altamura, Monopoli (IT)

(73) Assignee: General Electric Company, Schenectady, NY (US)

( * ) Notice: Subject to any disclaimer, the term of this patent is extended or adjusted under 35 U.S.C. 154(b) by 590 days.

(21) Appl. No.: 15/126,877

(22) PCT Filed: Mar. 18, 2015

(86) PCT No.: PCT/IB2015/052001
§ 371 (c)(1),
(2) Date: Sep. 16, 2016

(87) PCT Pub. No.: WO2015/140743
PCT Pub. Date: Sep. 24, 2015

(65) Prior Publication Data
US 2017/0114884 A1    Apr. 27, 2017

(30) Foreign Application Priority Data
Mar. 18, 2014 (IT) .............................. TO2014A0220

(51) Int. Cl.
*F16H 57/04* (2010.01)
*F16L 27/08* (2006.01)

(52) U.S. Cl.
CPC ....... *F16H 57/043* (2013.01); *F16H 57/0423* (2013.01); *F16H 57/0479* (2013.01); *F16H 57/0486* (2013.01); *F16L 27/0812* (2013.01)

(58) Field of Classification Search
CPC ............... F16H 57/043; F16H 57/0423; F16H 57/0426; F16H 57/0479; F16H 57/0486; F16L 27/0812; F16L 27/082
See application file for complete search history.

(56) References Cited

U.S. PATENT DOCUMENTS 2,242,184 A  *  5/1941  Reuter ................... F16D 25/14
                                                         137/580
3,598,147 A  *  8/1971  Kosaka .................. F16D 25/14
                                                         137/580

(Continued)

FOREIGN PATENT DOCUMENTS

DE        2425497 A1     12/1974
JP    H11287372 A     10/1999

(Continued)

OTHER PUBLICATIONS

International Search Report dated Jul. 21, 2015 for PCT application No. PCT/IB2015/052001.

(Continued)

*Primary Examiner* — Michael A Riegelman
(74) *Attorney, Agent, or Firm* — Dority & Manning, P.A.

(57) ABSTRACT

An oil transfer assembly has a fixed structure, with at least one inlet for receiving lubricating oil, and an interface member rotating about an axis and having a front face, from which at least one duct starts for conveying the lubricating oil; the assembly is provided with a slide having an annular chamber, which is delimited axially, on one side, by the front face and connects the inlet with the duct; the slide is coupled to the front face so as to guarantee a seal for the fluid of the annular chamber and engages a guide seat provided in the structure in an axially sliding manner.

11 Claims, 4 Drawing Sheets

(56) References Cited

U.S. PATENT DOCUMENTS

| | | | | |
|---|---|---|---|---|
| 3,911,952 A * | 10/1975 | Sugahara | ............... | B63H 23/30 |
| | | | | 137/580 |
| 4,033,376 A * | 7/1977 | Trelby | .................... | B02C 17/18 |
| | | | | 137/580 |
| 4,664,145 A * | 5/1987 | Stich | ..................... | F16L 27/087 |
| | | | | 137/580 |
| 8,192,184 B2 | 6/2012 | Hiltemann | | |
| 2002/0000251 A1* | 1/2002 | Suzuki | ................... | F16L 39/04 |
| | | | | 137/580 |
| 2010/0234113 A1* | 9/2010 | Drabek | ................ | F16H 57/043 |
| | | | | 464/7 |
| 2011/0030504 A1* | 2/2011 | Leger | ................. | F16H 57/0423 |
| | | | | 74/606 R |
| 2012/0129614 A1* | 5/2012 | Knoblauch | ......... | F16H 57/0427 |
| | | | | 464/7 |
| 2013/0145880 A1* | 6/2013 | Yamashita | ............ | F16H 57/042 |
| | | | | 74/467 |
| 2013/0172144 A1 | 7/2013 | Suzuki et al. | | |
| 2014/0309078 A1* | 10/2014 | Curti | .................... | F16H 1/2827 |
| | | | | 475/331 |
| 2015/0316141 A1* | 11/2015 | Altamura | ............ | F16H 57/0486 |
| | | | | 475/159 |
| 2015/0345591 A1* | 12/2015 | Altamura | ............ | F16H 57/0479 |
| | | | | 475/159 |
| 2016/0201792 A1* | 7/2016 | Naruoka | ............. | F16H 57/0456 |
| | | | | 475/159 |
| 2016/0215871 A1* | 7/2016 | Brault | .................... | F16H 57/042 |
| 2016/0265651 A1* | 9/2016 | Smook | ................ | F16H 57/0479 |
| 2016/0363211 A1* | 12/2016 | Bradley | .................... | F02C 3/04 |
| 2017/0023123 A1* | 1/2017 | McCune | .................. | F02C 7/06 |
| 2017/0114884 A1* | 4/2017 | Altamura | ............. | F16L 27/082 |
| 2017/0307064 A1* | 10/2017 | Riedisser | ............. | F16H 57/043 |

FOREIGN PATENT DOCUMENTS

| | | |
|---|---|---|
| JP | 2001193456 A | 7/2001 |
| JP | 2007278424 A | 10/2007 |
| JP | 2009228804 A | 10/2009 |
| JP | 5069244 B2 | 11/2012 |
| WO | 2001025666 A1 | 4/2001 |
| WO | WO2012029129 A1 | 3/2012 |

OTHER PUBLICATIONS

Written Opinion Report dated Jul. 21, 2015 for PCT application No. PCT/IB2015/052001.

Japanese Office Action Corresponding to Application No. JP2016-557887 dated Mar. 11, 2019.

* cited by examiner

OIL TRANSFER ASSEMBLY, TO LET LUBRICATING OIL FLOW FROM A STATIONARY PART TO A ROTATING PART, IN PARTICULAR FOR AN EPICYCLIC TRANSMISSION

TECHNICAL FIELD

The present invention relates to an oil transfer assembly, to let lubricating oil flow from a stationary part to a rotating part, in particular for an epicyclic transmission.

BACKGROUND ART

As is known, an epicyclic transmission comprises a pinion, a ring gear and a plurality of toothed planet wheels, which are interposed between the pinion and the ring gear and are supported by a planet-carrier. A transmission of such a type is capable of transmitting the motion between coaxial shafts rotating at different speeds and is very effective in providing such a function while maintaining contained weight and volumes. Epicyclic transmissions are largely used also in aeronautic engines, for example to transmit the motion to the fan in turbofan engines.

In most applications, the planet-carrier is of stationary type and is coupled to the fixed structure of the engine by means of a flexible element. Under these conditions, the components supported by the planet-carrier (gears of the toothed planet wheels, any bushings, etc.) are lubricated without particular difficulty by means of ducts which are fixed with respect to the engine structure and to the planet-carrier.

Nevertheless, certain applications employ a rotating planet-carrier, for example when the planet-carrier is connected to a (driving or driven) rotating shaft or when there is a need to maintain the same direction of rotation between the pinion and the ring gear. In these cases, the problem occurs of transferring the lubricating oil in an efficient and reliable manner from a stationary part (typically an oil reservoir) to a rotating part, that is the planet-carrier and the components supported thereby.

The solutions actually in use provide one or more pumps which transfer the oil under pressure into an annular cavity about a fixed sleeve with respect to the planet-carrier. The oil radially enters a passage of the sleeve and from here conveyed to the components requiring lubrication. The oil pressure in the annular cavity is guaranteed by seals configured so as to keep a particularly reduced radial clearance between the stationary part and the sleeve. The entity of such a clearance is accurately set by design, so as to maximize the volumetric transfer efficiency of the lubricating oil.

The known oil transfer systems described above are not satisfactory due to the elevated accuracy required in processing and mounting the components which define the aforesaid radial clearance. Furthermore, during assembly there is a non inconsiderable risk of damaging the seals when the sleeve is axially inserted, whereby the correct sealing is compromised.

Furthermore, the known oil transfer system described above is not able to compensate for the wear and inevitable variations of relative position between the stationary part and the rotating part (caused for example by differences in temperature between the startup conditions and the running conditions). Furthermore, in current epicyclic transmissions for vehicles, the pressure and flow rate values required for the lubrication and the peripheral speed values of the planet-carrier are relatively high and therefore may compromise the desired sealing, especially when the components are worn.

DISCLOSURE OF INVENTION

It is the object of the present invention to provide an oil transfer assembly, to let lubricating oil flow from a stationary part to a rotating part, in particular for an epicyclic transmission, which allows the above problems to be solved in a simple and affordable manner.

According to the present invention, an oil transfer assembly is provided, to let lubricating oil flow from a stationary part to a rotating part, in particular for an epicyclic transmission, as defined in claim 1.

BRIEF DESCRIPTION OF THE DRAWINGS

The present invention will now be described with reference to the accompanying drawings, which illustrate a non-limiting exemplary embodiment thereof, in which.

BEST MODE FOR CARRYING OUT THE INVENTION

Figure 1:
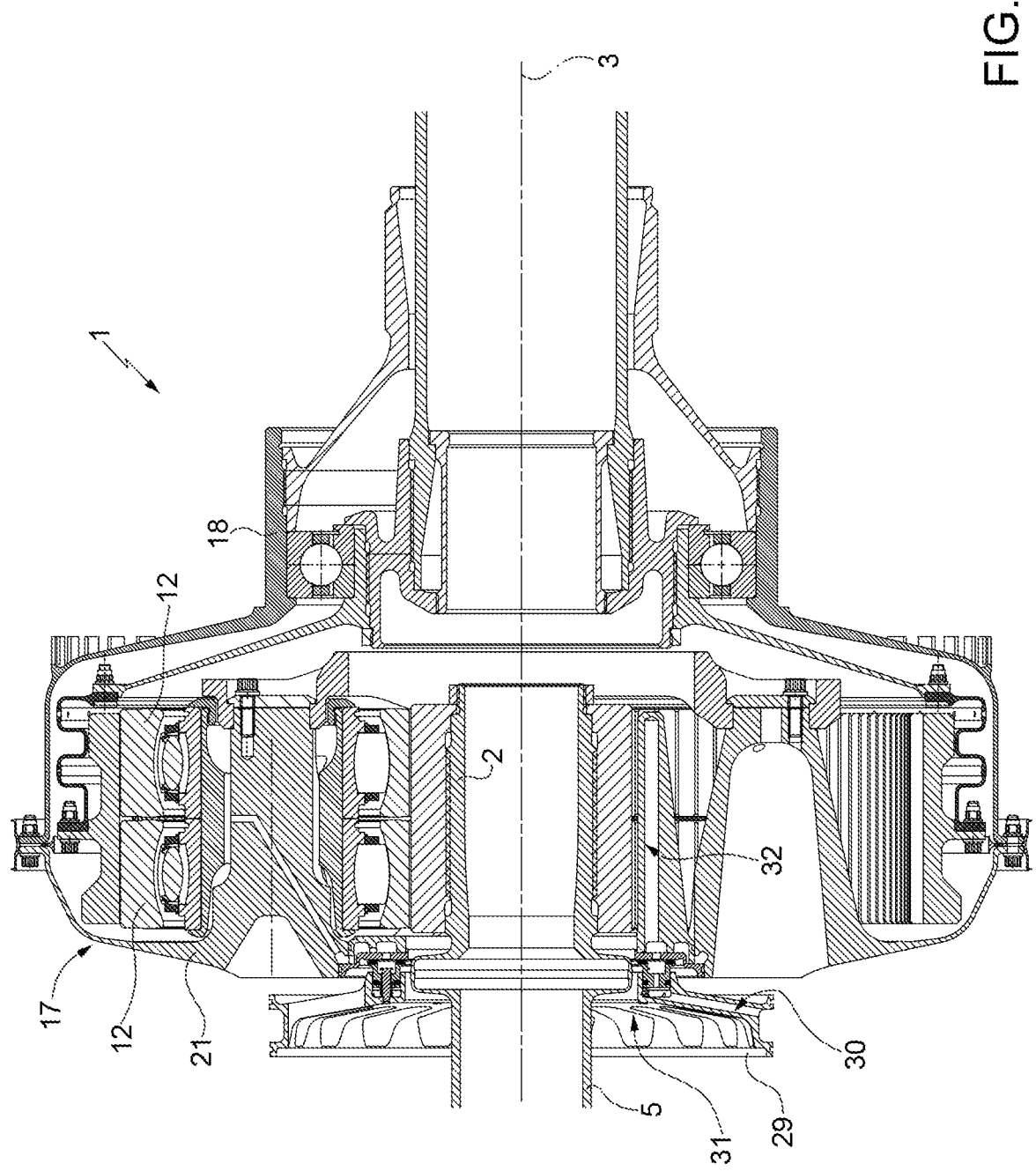
FIG. 1 shows, in meridian section, a first preferred embodiment of the oil transfer assembly, to let lubricating oil flow from a stationary part to a rotating part, in particular for an epicyclic transmission, according to the present invention.

With reference to FIG. 1, numeral 1 indicates an epicyclic transmission, in particular for aeronautic applications, comprising a pinion 2, which is rotary about an axis 3 and is connected to a transmission shaft 5 in an angularly fixed manner.

Gearing 1 also comprises a plurality of planet wheels 12, supported, in a manner not described in detail, by planet-carrier 17, which is rotating about axis 3 and, preferably, is connected to a transmission member 18 in an angularly fixed manner.

The planet-carrier 17 is defined by a structure comprising an annular portion 21, which is coaxial to shaft 5, has a substantially plate-like shape, axially faces the planet wheels 12 and is spaced from shaft 5 and from pinion 2.

The planet-carrier 17 axially faces a structure 29 which is fixed and has one or more channels 30 defining an inlet for receiving lubricating oil which is pressurized from a reservoir (not illustrated) by one or more pumps (not illustrated). In particular, structure 29 is arranged around shaft 5 and axially faces the annular portion 21. Structure 29 forms part of an oil transfer assembly 31 which conveys the lubricating oil from channel 30 towards a plurality of lubricating channels 32 which are fixed with respect to the planet-carrier 17.

Figure 2:
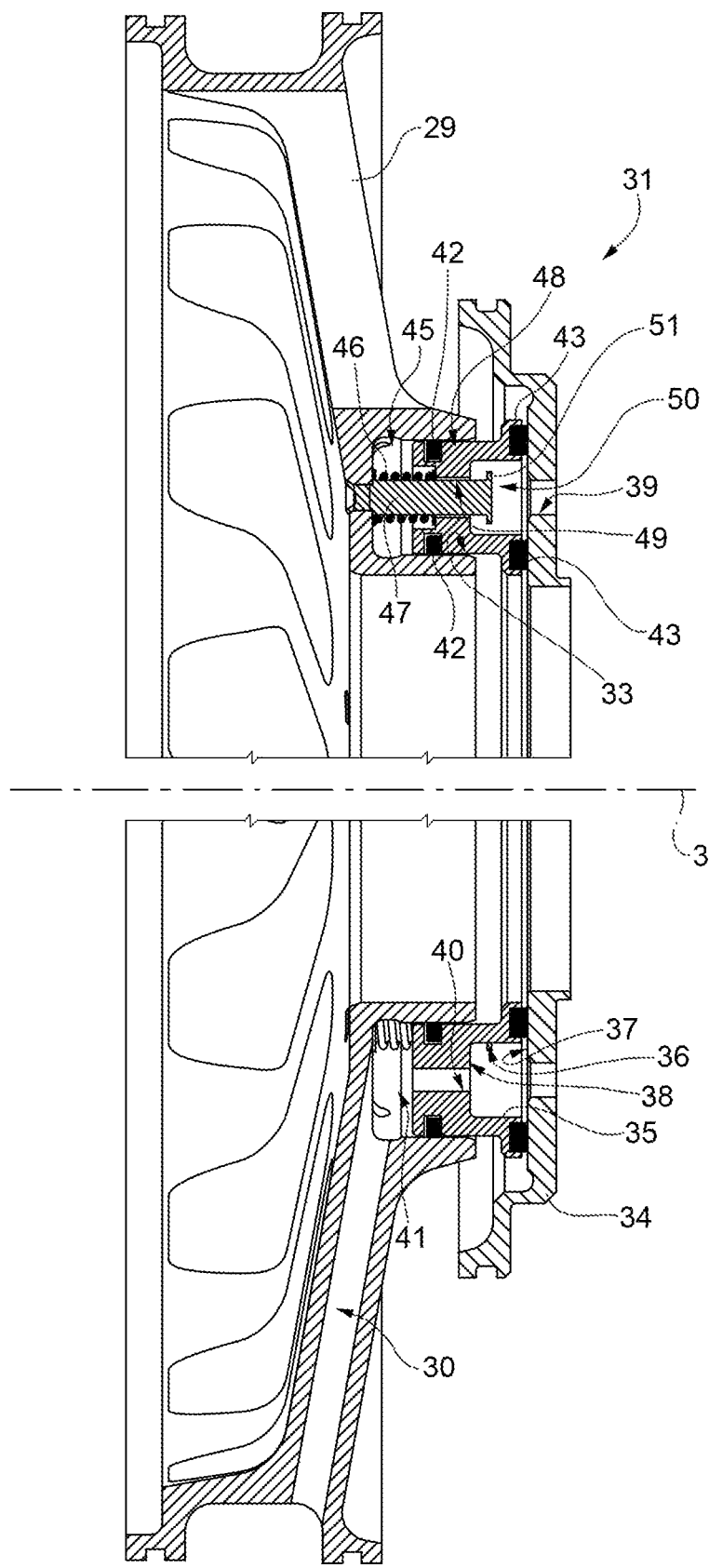
FIG. 2 shows, on enlarged scale and with parts removed for clarity, the assembly in FIG. 1.

With reference to FIG. 2, assembly 31 comprises an annular guide seat 33 defined by structure 29, and an interface member 34, which has an annular shape, is coaxial to seat 33 along axis 3 and is fixed with respect to the planet-carrier 17, therefore is rotating. Preferably, the interface member 34 is fixed to the annular portion 21. Assembly 31 further comprises a sliding shoe or slide 35, which engages seat 33 in axially sliding manner and has an annular chamber 36 delimited axially by a front. face 37 of the interface member 34, on one side, and by a bottom annular surface 38 of sliding shoe 35, on the other side.

Chamber 36 permanently connects, on one side, the channels 32 through one or more ducts 39 made in the interface member 34; on the other side, it connects channel 30 through one or more ducts 40 made in slide 35 and through an annular chamber 41 defined by a bottom zone of seat 33, which is not occupied by slide 35.

Slide 35 is fluid-tightly coupled to the side surfaces of seat 33, preferably by means of the interposition of sealing rings 42. At the same time, slide 35 is coupled to face 37 by means of two sealing rings 43, which are placed on opposite radial sides of chamber 36 and are made preferably in a mixture of graphite and binders.

In particular, the sealing rings 43 are fixed with respect to slide 35. In use, annular meatus are formed between the sealing rings 43 (fixed) and face 37 (rotating), filled with oil defining a hydrodynamic lift on slide 35 in axial direction, so as to guarantee the sealing against oil leaks from chamber 36.

Assembly 31 further comprises a thrust device 45, which exerts an axial force on slide 35 towards the interface member 34, so as to automatically compensate for the axial clearances and the variations in axial position (due to wear, to imprecise realization and/or mounting, etc.) between the interface member 34 and slide 35.

Preferably, the forces due to the oil pressure and acting on sliding shoe 35 have a null result in axial direction. In other words, the axial force due to the oil pressure in the annular chamber 41 is equal to the axial force due to the oil pressure in the annular chamber 36. Assuming that the ducts 40 cause a substantially null drop in pressure and, therefore, the oil pressure substantially equal between the chambers 41 and 36, the balancing of the pressure axial forces equals the equality between the circular ring area between the sealing zones of the rings 42 and the circular ring area between the sealing zones of the rings 43.

The first circular ring area corresponds obviously to the cross section of seat 33. The second circular ring area equals the cross section of the annular chamber 36 at face 37 and is assumed equal to the surface between the average circumferences of the sealing rings 43.

Thanks to the axial balancing of the forces caused by the pressure, the axial forcing with which the sealing rings 43 are pressed against face 37 and, therefore, the friction force between sliding shoe 35 and face 37, are defined only by the axial load exerted by the thrust device 45.

In the embodiment in FIG. 2, device 45 comprises a plurality of springs 46 accommodated in chamber 41, in positions angularly spaced from one another about axis 3. In particular, the springs 46 are helical springs fitted about respective pins 47, which are parallel to axis 3 and are fixed to structure 29 at an axial end thereof.

Assembly 31 further comprises an angular retention, or anti-rotation, device, indicated by numeral 48, which holds slide 35 in substantially fixed angular position with respect to structure 29. In particular, device 48 comprises a plurality of holes 49, which are made in slide 35 and are engaged by the pins 47 r axially sliding manner. In particular, the holes 49 are parallel to, and alternate with, the ducts 40 in circumferential direction.

Assembly 31 further comprises an axial stop device 50, which prevents slide 35 from slipping out of seat 33, at least during the assembling step, thus opposing the thrust of device 45. In particular, device 50 comprises one or more protrusions 51, which form part of the pins 47, are arranged in chamber 36 and axially face the bottom surface 38, so as to define an axial stroke stop for the sliding of slide 35 towards the interface member 34.

In use, the lubricating oil enters chamber 41 from the channels 30, then goes to chamber 36 through the ducts 40 and finally enters the rotating part defined by the planet-carrier 17 through the ducts 39. The dimension of the ducts 40 is set by design so as to minimize the drops in pressure while oil flows from chamber 41 to chamber 36. Chamber 36 is substantially airtight due to the sealing rings 43 and due to the presence of slide 35 which adapts the operating conditions of assembly 31 to the actual axial position of structure 29 with respect to face 37.

Figure 3:
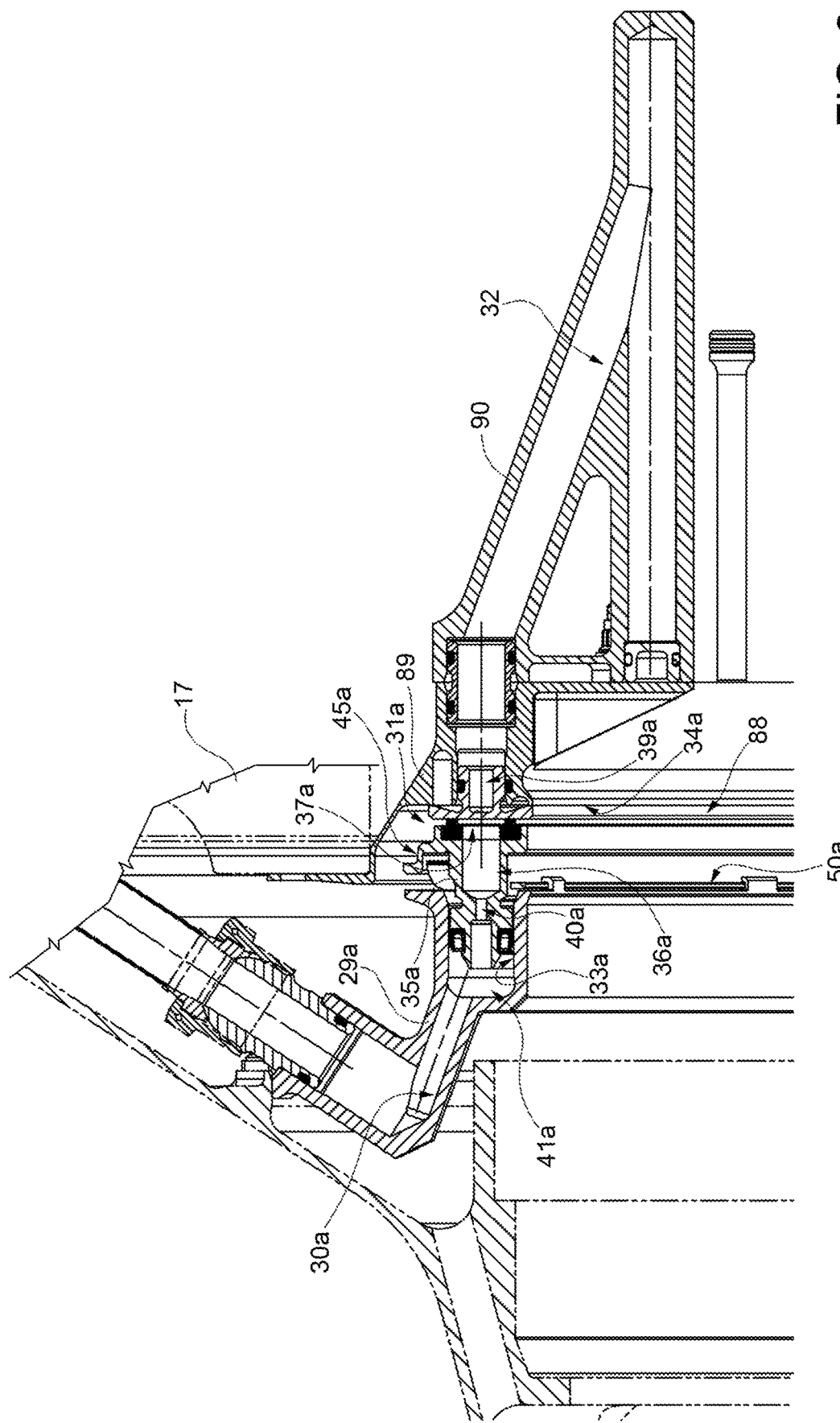
FIG. 3 is similar to FIG. 2 and shows a second preferred embodiment of the oil transfer assembly, to let lubricating oil flow from a stationary part to a rotating part, in particular for an epicyclic transmission, according to the present invention.

FIG. 3 shows an oil transfer assembly 31*a*, which forming parts are marked, when possible, by the same numerals used in FIGS. 1 and 2 for the corresponding components of assembly 31, but followed now by letter "a".

Assembly 31*a* differs from assembly 31 in that the devices 45*a*, 48*a* and 50*a* are outside the passages where the lubricating oil flows (chambers 36*a*, 41*a;* ducts 39*a*, 40*a*; etc.) so as to reduce the risk of formation of debris, which tends to be formed because of wear of such devices as time passes and which would compromise the properties of the lubricating oil. If necessary, according to variants not illustrated, even just one of the devices 45*a*, 48*a*, 50*a* may be provided outside such passages.

Figure 4:
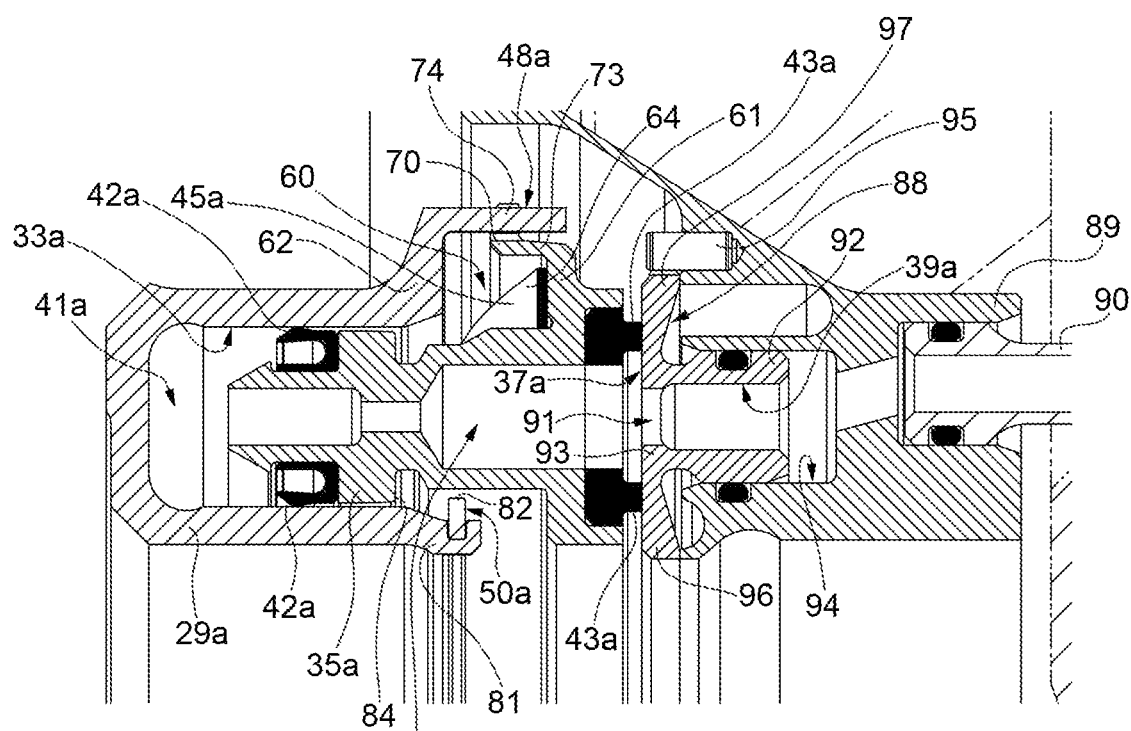
FIG. 4 is a different section, on enlarged scale, of a detail of the assembly in FIG. 3.

In particular, with reference to FIG. 4, device 45*a* is housed in an annular seat 60, outside seat 33*a* and axially defined, on one side, by a flange 61 of slide 35*a* and, on the other side, by a flange 62 of structure 29*a*. Preferably, device 45*a* is defined by a single annular spring, of the undulated sheet type, i.e. having a plurality of loops 64 which are spaced from one another about axis 3 and consist of a first series coupled to rest. on flange 61, and of a second series, alternate to the first one, and coupled to rest on flange 62.

With regards to device 48*a*, the latter preferably comprises at least one radial tooth 70 which is part of one among slide 35*a* and structure 29*a* and engages, in an angularly fixed and axially sliding manner, a corresponding retention seat made in the other among slide 35*a* and structure 29*a*. In particular, tooth 70 and the retention seat form part of axial appendages 73 and 74, respectively, which protrude from the flanges 61 and 62.

In particular, appendage 73 is radially more inner with respect to appendage 74 and is axially spaced from flange 62, so as to have an axial clearance which allows slide 35*a* to slide freely in seat 33*a*. Alternatively, appendage 74 is radially more inner and is axially spaced from flange 61. The appendages 73, 74 are aligned in radial direction and radially delimit seat 60 on one side. On the other side, seat 60 is delimited radially by slide 35*a*.

Figure 5:
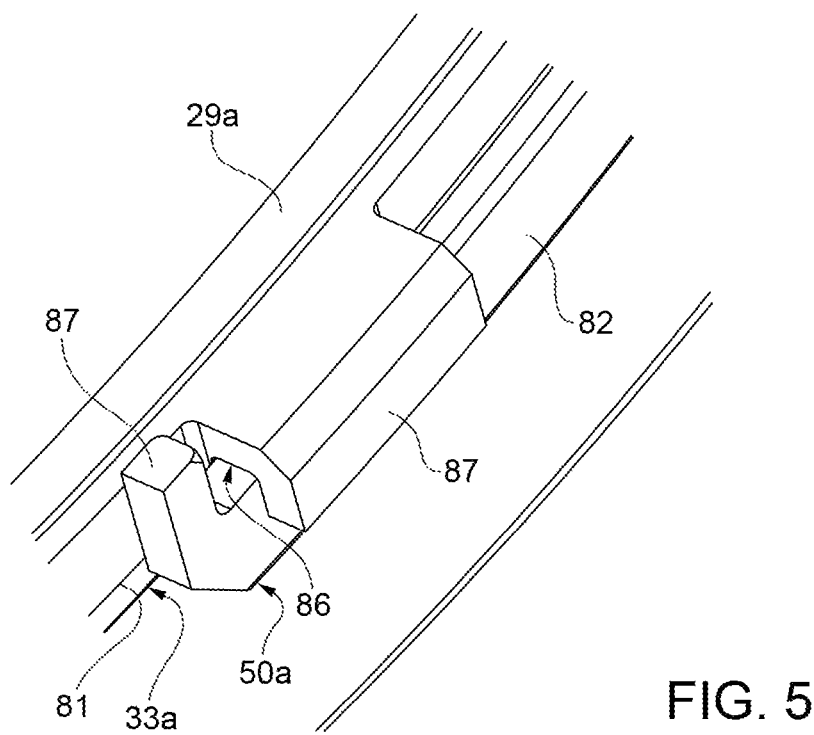
FIG. 5 is perspective view, on enlarged scale, of another detail of the assembly in FIG. 3.

With regards to device 50*a*, the latter is defined by an element coupled to structure 29*a* in fixed axial position at an end edge 81 of seat 33*a*. Element 50*a* is mounted in structure 29*a* during the assembly of assembly 31*a* after having inserted slide 35*a* into seat 33*a,* and comprises a stop portion 82 which protrudes radially so as to define a stop shoulder axially facing a portion 84 of slide 35*a*. In particular, with reference to FIG. 5, the stop portion 82 has an arch shape and engages, in axially fixed manner, one or more grooves 86 which extend in circumferential direction and are defined by respective cradle portions 87 arranged at the end edge 81.

Element 50a further comprises at least one radial tooth 87 facing one of the portions 87 in tangent direction so as to angularly hold element 50a.

Again with reference to FIG. 3, preferably the interface member 34a comprises a front ring 88; a supporting body 89 fixed to the planet-carrier 17, for example at an outer flange thereof; and a rear body 90, fixed to body 89 and configured for the distribution of the oil.

As shown in FIG. 4, ring 88 comprises a plate 91, defining face 37a, and a collar 92, which protrudes at the back from an intermediate annular portion 93 of plate 91, defines the ducts 39a and fluid-tightly engages an annular seat 94 of body 89 in axially sliding manner. In particular, the rotation of collar 92 in seat 94 about axis 3 is prevented by one or more pins 95 which angularly block ring 88 to body 89.

Plate 91 ends radially with an inner annular portion 96 and with an outer annular portion 97, which are arranged on opposite sides of portion 93 and are resting axially against body 89 at two annular zones, which positions are radially more outer and more inner than the seal zones defined by the rings 43a. Indeed, the rings 43a rest on portion 93, and the ducts 39a start from the latter.

The rear part of portion 93 is shaped and sized so as to remain axially spaced from body 89, to deform under the axial thrust exerted by the lubricating oil pressure in chamber and under the axial thrust of device 45a. The cross section of plate 91 is in practice similar to a beam which is resting on the ends and, in use, is stressed to bend at portion 93. The entity of the deformation depends on the axial thrust undergone by portion 93 and by the distance with respect to the resting zones defined by portions 96, 97.

This bending deformation of portion 93 substantially makes face 37a concave and therefore makes the oil meatus defined axially between the sealing rings 43a and face 37a convergent (the convergence considered in radial direction starting from chamber 36a). The convergence of the two meatus makes stable the hydrodynamic lift of slide 35a at such seal zones. Indeed, if divergent meatus were obtained by chance, the hydrodynamic lift could be instable, therefore rebounds could occur and hence impacts of slide 35 against the interface member 34.

The advantages brought by assembly 31, 31a are apparent from what disclosed above. Indeed, by being able to fluctuate in axial direction, slide 35, 35a allows the same sealing conditions to always be kept at face 37, 37a, regardless of the relative axial position between structure 29, 29a and the rotating part defined by the planet-carrier 17. In other words, assembly 31, 31a has an increased tolerance to construction errors and to mounting inaccuracies, and allows the wear in the sealing zones and/or structure deformations to be automatically recovered axially.

In particular, device 45, 45a keeps slide 35, 35a against face 37, 37a regardless of the pressure in chambers 36, 36a, , 41, 41a and, therefore, regardless of the operating conditions. In particular, device 45 is particularly simple because it is defined by a single annular elastic element which is easily mounted.

Furthermore, device 48, 48a causes slide 35, 35a with its chamber 36, 36a to be angularly fixed with respect to structure 29, 29a. Therefore, the sealing rings 42, 42a are only subjected to a slight axial sliding, which involves relatively low wear. In other words, the wear between the rotating parts and the stationary parts is localized at the sealing rings 43, 43a, where the axial gap is compensated for automatically by the possibility of fluctuating slide 35, 35a.

It is then apparent that device 50, 50a facilitates mounting assembly 31, 31a because it avoids the disengagement of slide 35, 35a from seat 33, 33a. Device 50a is relatively simple to mount on structure 29a and does not require special processing which instead is required for the axial ends of the pins 47.

It is apparent from what mentioned above that modifications or variants may be made to assembly 31, 31a, without departing from the scope of protection defined by the independent claims.

In particular, the devices 45, 45a, 48, 48a, 50, 50a may be different from what indicated by way of example; and/or the sealing rings 43, 43a may be made with different. cross sections and/or materials, and/or could be fixed to the interface member 34, 34a instead of to slide 35, 35a.

Furthermore, device 45, 45a of the elastic type could be absent, or only perform a positioning function during mounting, if the oil pressure in chamber 41 is sufficient to axially push slide 35, 35a towards face 37, 37a during use and to guarantee the seal of chamber 36, 36a through the meatus at the sealing rings 43, 43a.

The invention claimed is:

1. An oil transfer assembly to let lubricating oil flow from a stationary part to a rotating part, the oil transfer assembly comprising:
   a structure fixed with respect to said stationary part and having at least one inlet for receiving lubricating oil;
   an interface member adapted to be fixed to said rotating part so as to rotate about an axis and having:
   a) a front face;
   b) at least one duct for conveying lubricating oil to said rotating part;
   an annular chamber which extends about said axis and puts said inlet into communication with said duct;
   characterized in that
   said duct extends starting from said front face;
   said annular chamber is axially delimited, on one side, by said front face and, on the other side, by a slide which is coupled to said front face so as to guarantee fluid-tightness of said annular chamber and engages in an axially sliding manner, a guide seat provided in said structure;
   said oil transfer assembly further comprises an axial thrust device exerting an action which axially pushes said slide towards said front face.

2. The oil transfer assembly according to claim 1, characterized in that said axial thrust device comprises at least one elastic element arranged outside the annular chamber.

3. The oil transfer assembly according to claim 1, characterized in that said axial thrust device comprises a single elastic element, which has an annular shape, extends about said axis and comprises a plurality of opposite loops alternating about said axis.

4. The oil transfer assembly according to claim 1, characterized by comprising angular retention means to keep said slide in fixed angular position with respect to said structure.

5. The oil transfer assembly according to claim 4, characterized in that said angular retention means are arranged outside the annular chamber.

6. The oil transfer assembly according to claim 4, characterized in that said angular retention means comprise at least one radial tooth and one corresponding retention seat engaged by said radial tooth in an angularly fixed and axially sliding manner.

7. The oil transfer assembly according to claim 1, characterized by comprising axial stop means, which are axially fixed with respect to said structure and axially face a portion of said slide so as to prevent said slide from disengaging said guide seat.

8. The oil transfer assembly according to claim 7, characterized in that said axial stop means are arranged outside the annular chamber.

9. The oil transfer assembly according to claim 7, characterized in that said axial stop means are defined by an element that extends in an arch shape about said axis and is mounted on said structure in a fixed axial position at an end edge of said guide seat.

10. The oil transfer assembly according to claim 1, characterized in that said interface member comprises a front plate defining said front face and a supporting body; said front plate having:
- a radially external annular portion;
- a radially internal annular portion; and
- an intermediate annular portion, arranged radially between said radially external and radially internal annular portions;
- said radially external and radially internal annular portions resting axially against said supporting body in a radially more external area and in a radially more internal area, respectively, with respect to the sealing zones between said slide and said front face; said intermediate annular portion being axially spaced from said supporting body so as to deform under an axial thrust on said front face during use.

11. The oil transfer assembly according to claim 1, characterized in that the cross section of said guide seat and the cross section of said annular chamber have equal areas at said front face.

* * * * *